INVENTOR
ARTHUR J. LUSCOMBE
BY Williamson, Palmatier & Bains
ATTORNEYS

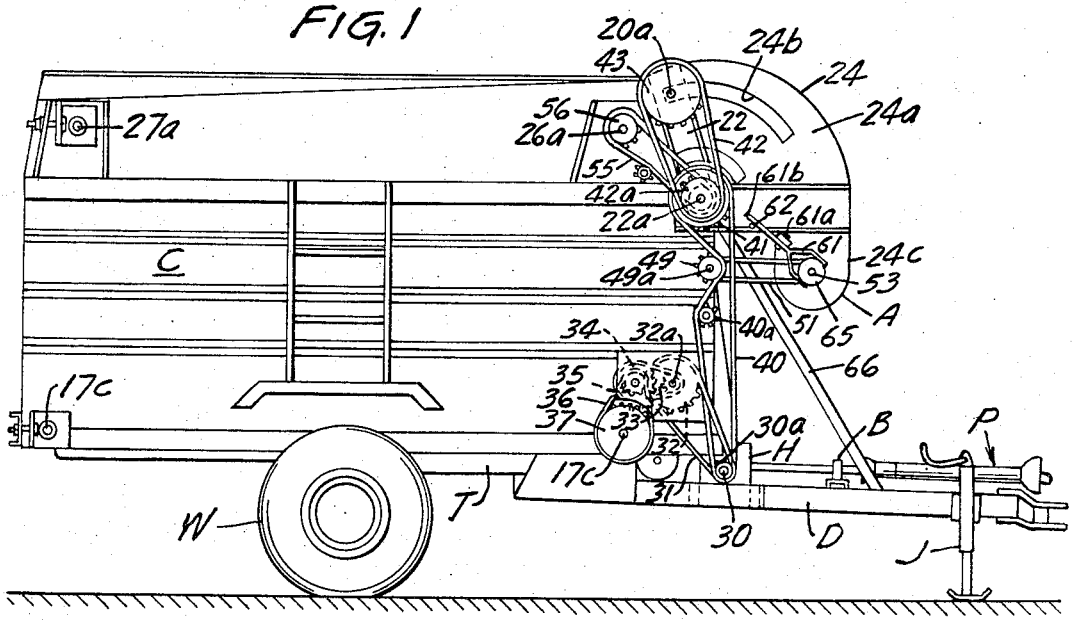
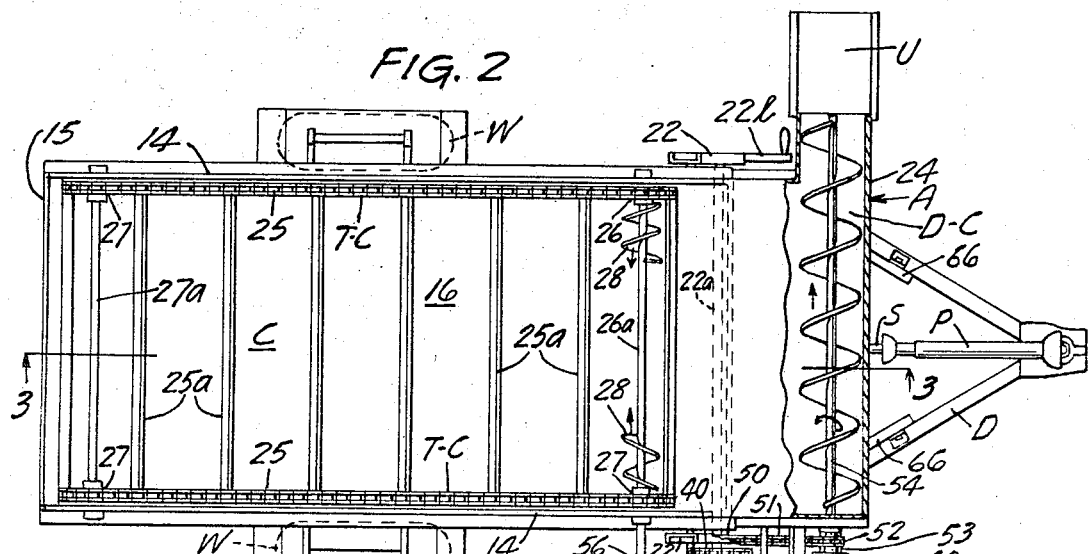
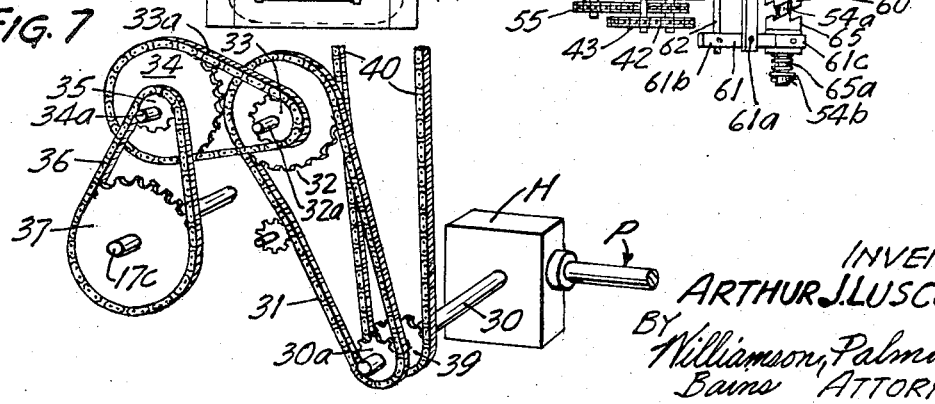

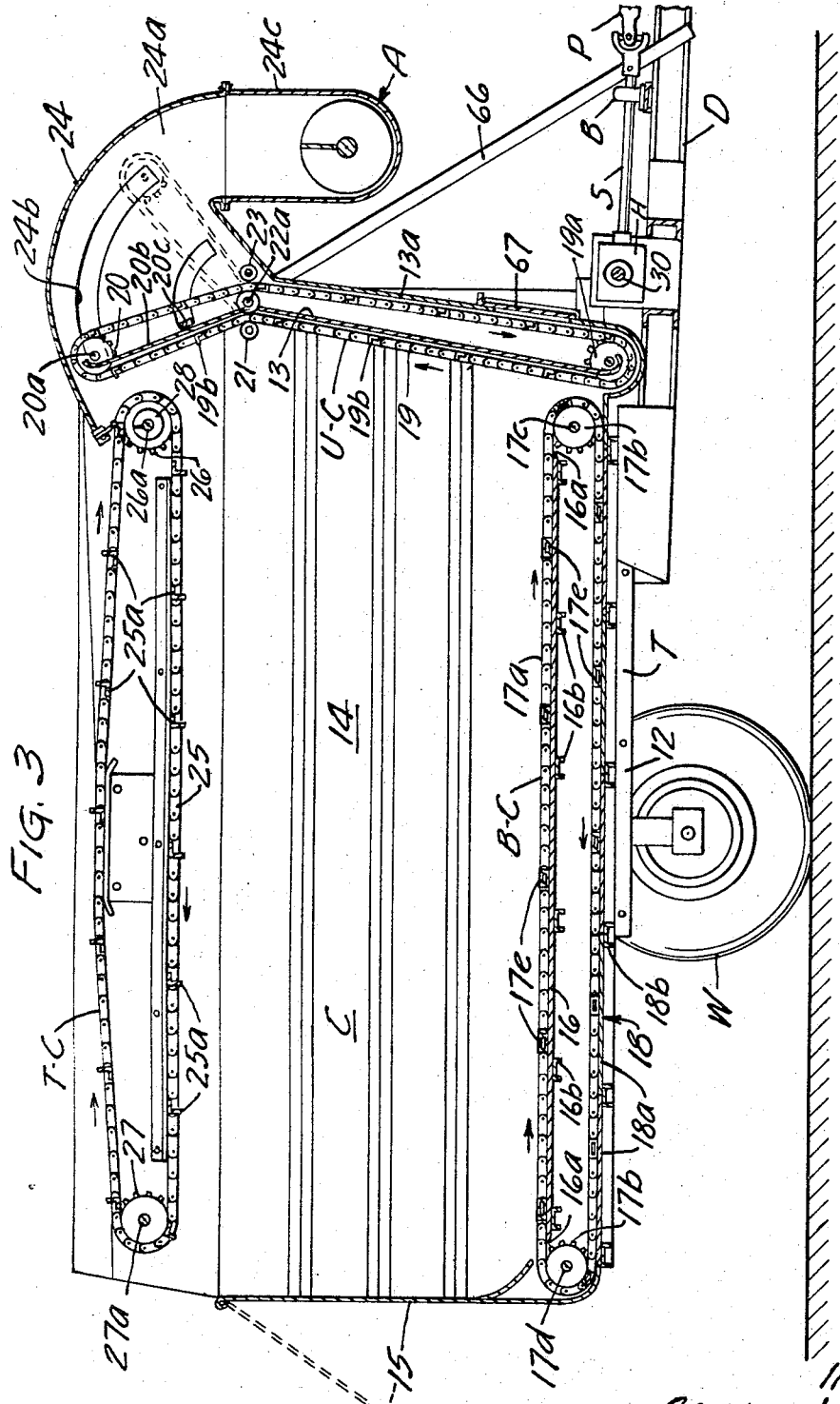

United States Patent Office 3,379,417
Patented Apr. 23, 1968

3,379,417
MIXING MACHINE FOR HEAVY FRAGMENTED
MATERIALS SUCH AS SILAGE
Arthur J. Luscombe, Rte. 1, Dolliver, Iowa 50531
Filed May 24, 1967, Ser. No. 640,916
8 Claims. (Cl. 259—6)

ABSTRACT OF THE DISCLOSURE

A high capacity feed mixing machine specially adapted for the intimate admixing of heavy, coarse feed material such as silage, with one or more granular, pelleted or fragmented feed materials varying substantially in shape, specific gravity and size from said heavier materials. This improved machine is characterized by a combination of closely cooperating conveyor sections or mechanisms disposed within the confines of a large rectangular body or container, with bottom, end and side walls, to the end that various feed materials may be put into the machine during operation or when idle, and will be generally supported upon a slow traveling bottom conveyor medium moving in one direction at slow speed, then tumbled and fluffed by an upstanding conveyor having elevating characteristics at one end of the body, and thereafter skimmed, toppled, fluffed and dropped by a relatively fast traveling upper, substantially horizontal conveyor section, all conveyor sections extending cumulatively throughout substantially the entire width of the container or body. The machine is preferably mobile and may operate and do its mixing and pickup of various feed materials while in operation. It is adapted at will to discharge thoroughly admixed feed materials of the nature heretofore specified, from desired discharge locations preferably at one side of the machine.

This invention relates to machines or apparatus, preferably mobile in nature, which are adapted for use particularly for intimately and uniformly admixing heavy coarse feed material such as silage with other feed materials which vary substantially in size, characteristics, specific shapes and weight.

The prior art, such as my United States Patents Nos. 2,896,923 and 3,133,727, show feed mixing machines employing large upright tanks and a concentric smaller upright auger or conveyor which have proven highly satisfactory for admixing various relatively light fragmented and ground materials, and for discharging the same at a desired, or a plurality of desired unloading points. However, the problem of mixing heavy and coarse fragmented feed material such as silage and heavy stock forage materials, has been indeed a difficult one. Some machines of the prior art which show a combination of a bottom apron or slat conveyor, or auger conveyors, with an elevating conveyor, are incapable of use in properly and uniformly admixing silage or silage with a number of other lighter feed ingredients such as pellets, ground or unground, cereal grains, alfalfa and the like.

The improvements of my invention consist in utilizing a conventional type, large rectangular hopper or container body with a combination of conveyor and mixing elements contained therein, correlated at such speeds as to cause fluffing, rolling and toppling of the various materials through many recurring elliptical courses which, through the aid of gravity, thoroughly admix the ingredients into a uniform mixture for discharge, regardless of the sizes of the various ingredients, the specific gravities and shapes.

I have discovered that an essential factor in such a successful machine is an overall, fast traveling upper conveyor traversing substantially the entire width of the body and cooperating with a fast traveling elevating or end upstanding conveyor, and with a relatively very slow moving bottom conveyor, all within the confines of the body.

A further object is the provision of a machine of the class described, wherein the machine may be fed with the various ingredients while in travel and operation, and wherein discharge of the thoroughly and uniformly admixed materials may be made at desired discharge points while the machine is in travel.

A further object is the provision of such a mixing machine where discharge of the admixed material is achieved without opening of a gate or closure member, but through the shifting of the upper portion of the upstanding or elevating conveyor from a somewhat rearwardly declined to a somewhat forwardly inclined position in combination with a discharge receiving hopper.

A still further object is the provision of a machine of the class described which is adapted for multipurpose use in transporting various materials, and in discharging the same from either end of the machine.

These and other objects and advantages of my invention will more readily appear from the following description made in connection with the accompanying drawings wherein like reference characters refer to similar parts throughout the several views, and in which:

FIG. 1 is a side elevation of an embodiment of the machine showing driving connections for the several conveyor units mounted therein;

FIG. 2 is a top plan view of said machine, parts being broken away to show the discharge conveyor;

FIG. 3 is a vertical section taken substantially on the line 3—3 of FIG. 2 showing the closely cooperating mixing and conveyor units of the machine;

FIG. 7 is a diagrammatic elevational view showing the reduced speed driving connections for the bottom conveyor B-C.

Figure 5:
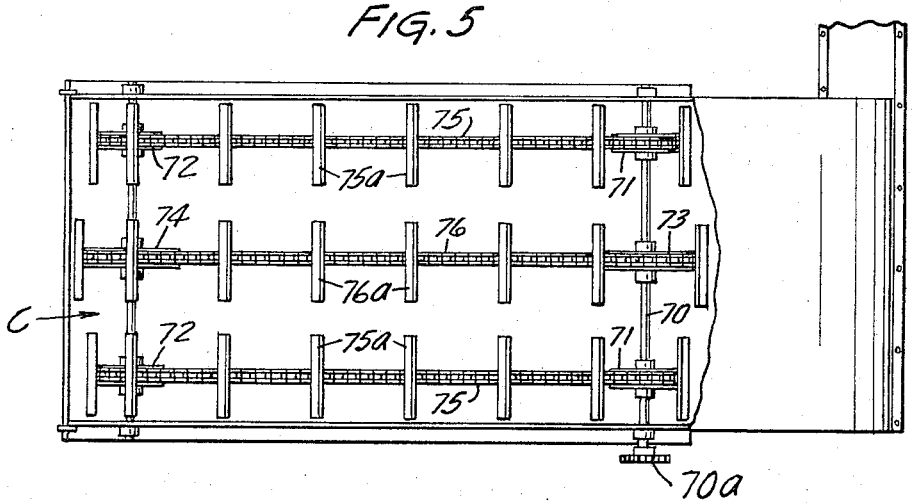
FIG. 5 is a top elevation of a modified form of the invention.

Referring now to the machine or apparatus illustrated in FIGS. 1 through 7 of the drawings, the machine is mounted for mobility on a sulky truck indicated as an entirety by the letter T, supported by a pair of aligned wheels W, preferably supplied with pneumatic tires and comprising a horizontal frame provided with spaced rails 12 interconnected at their forward ends with a heavy draft bar D which extends dome distance forwardly of the body of the mixer, and as shown, has a conventional jack support J for maintaining the frame horizontal when it is not coupled with a towing vehicle such as a tractor.

The conventional power take-off P is mounted upon a draft bar D and the shaft S of the power take-off is journaled in a heavy, upstanding bearing block B, mounted upon the intermediate portion of the draft bar, as clearly shown in FIG. 1.

The mixing body of my machine comprises a very large, elongate, rectangular container indicated as an entirety by the letter C, having a front wall 13, a pair of parallel spaced side walls 14, and a hinged rear wall 15, hinged at its upper end to the side walls and constituting a door. The container body is preferably open at its top for receiving the various feed materials which may be discharged or dumped therein.

The container body has a stationary bottom 16 affixed as shown to transverse spaced channels 16b secured at their ends to the side walls 14. A bottom conveyor unit B-C travels over bottom 16, as shown, said unit comprising a pair of chains 17a disposed in widely spaced relation and each endlessly trained about a pair of sprockets 17b which are affixed to shafts 17c and 17d respectively. The forward common shaft 17c is driven and the bottom conveyor B-C is driven at relatively low speed, its foot travel being within the range of from 12 to 30 feet per minute only. It is normally driven with its upper leaf traveling forward, as clearly shown in FIG. 3.

As shown, the mass supporting and mass moving bottom conveyor B-C is of endless open work type, having transverse slats 17e of channel construction interconnected at their ends with the chains 17a. The chains 17a work over the bottom 16 of the mixing container and the conveyor works with close clearance to the sides 14 of mixing container C, traversing substantially the entire width thereof. It will be noted that slots 16a are provided at the front and rear of the container bottom 16 through which the endless chains and slats may pass. A removable bottom 18 is provided below the lower run of conveyor B-C to collect and prevent dropping of some fine feed material which may find its way to the underleaf of the conveyor. The bottom, as shown, is made up of rectangular sections or separately removable plates 18a supported upon transverse channel bars 18b.

An upstanding conveyor indicated as an entirety by the letters U-C is provided preferably at the front of container body C, and also in the form shown comprising a pair of widely spaced endless chains 19 which are trained about pairs of widely spaced sprockets 19a at the lower end of the conveyor and are trained over sprockets 20 affixed to a driven shaft 20a at the upper end of conveyor U-C. The upstanding conveyor U-C has a number of very important functions. It acts as an elevator to receive and lift mass particular materials from the forward end of bottom container B-C. Further, in the upward movement of the effective inwardly disposed run through its moving slats 19b, conveyor U-C acts to topple and mass the fragmented and granular material. As the material is toppled and dropped rearwardly it is fluffed and spread.

It will be noted that the greater part of the length of the endless conveyor U-C from its bottom end to approximately two thirds or more of its height, is predeterminately positioned (preferably slightly inclined forwardly from the vertical, as shown) while the upper reach of the conveyor is, in operative mixing position, declined from the vertical in the opposite direction rearwardly of the mixing container C. The innermost run of conveyor U-C at the sides 14 is guided by travel of the chains 19 beneath short guide rollers 21 affixed to the respective sides 14 at the appropriate points.

The upper sprocket-supporting shaft 20a of conveyor U-C is shiftable, being journaled in the upper ends of two heavy shift arms 22 of channel form, which are pivoted at their lower ends on a driven cross shaft 22a, extending through the entire width of container C and said shift arms are mounted exteriorly of the sides of the container body C. The shift arms 22 are readily shiftable into the dotted line positions shown in FIG. 3, at which time the forward or outermost run of the conveyor is guided by engagement of the endless chains 19 with guide rollers 23 attached in opposed relation to the opposite sides of an upper discharge casing and hopper 24, later to be described in detail. As a part of the upstanding conveyor U-C, a wall plate 20b is shiftable with the shaft 20a and is affixed as shown to a cross bar 20c which works through suitable slots provided in the sides of the hopper casing 24. The lower edge of the conveyor plate 20b is rolled to form a loop which is journaled upon and surrounds the pivot shaft 22a.

When the upper end or reach of conveyor U-C is positioned in the dotted line position, the material elevated will be directed forwardly into the discharge casing and hopper 24, dropping and passing therethrough, and dropping downwardly therefrom into a discharge conveyor medium indicated as an entirety by the letter A.

I have discovered that for operation and successful admixing of heavy materials of large size, such as silage or other chopped stalks with lighter and smaller material such as alfalfa, hay, pellets, ground or unground cereal grains, the upstanding conveyor U-C must travel at a very high speed relative to the travel of bottom conveyor B-C which supports, accumulates, moves and topples the mass, directing it forwardly of the machine. Preferably the range of relative foot-per-minute travel of the effective runs of conveyors B-C and U-C would be within a range of between 12 to 25 linear travel feet per minute for the bottom conveyor and from 60 to 150 linear travel feet per minute for the upstanding conveyor U-C.

A third component which is vital in cooperation for the successful operation of my improved machine is the top conveyor identified as an entirety by the letters T-C, the underleaf of which is substantially horizontally disposed and travels in the direction indicated by the arrows in FIG. 3. This upper conveyor may take a number of different forms, some alternative forms of which are shown in some of the views of the drawings, but in any event, its receiving end is disposed in close relation to the upper shiftable reach of upstanding conveyor U-C, just rearwardly thereof and below the top extremity of conveyor U-C, and this conveyor has the effect of skimming, toppling, massing and fluffing the material while moving the same in a rearwardly direction, opposite to the travel of the mass supported upon the slow bottom conveyor B-C.

As shown in the form of FIG. 3, the top conveyor T-C also comprises a pair of widely spaced chains 25, carrying outwardly at spaced intervals transverse slats 25a. The endless chains 25 are trained about two sets of sprockets 26 and 27, affixed respectively to rotary shafts 26a and 27a. Said shafts are respectively disposed adjacent the ends and top portion of the side walls 14 with the conveyor extending substantially the entire length of the mixing container C. It is essential that this conveyor T-C be driven to travel at its effective lower run at relatively very high speed as contrasted with the slow travel of the bottom supporting conveyor B-C. The relative speeds of linear travel of the top conveyor T-C and lower B-C are approximately within the same range as the comparison of speeds of the upstanding conveyor U-C and bottom supporting conveyor B-C. Conveyor T-C is driven at its forward end from power supplied to the shaft 26a.

Short screw conveyor flights 28 are affixed to the outer portions of driven shaft 26a adjacent the side walls 14 of container C to effectively prevent jamming of the feed materials in the side sprockets 26.

As has been previously stated, mixing container body C has its top open so that various feed materials may be dropped, poured or otherwise delivered over the top and will fall through the moving top conveyor T-C in the spaces between slats and may be supplied even when the mobile unit is in travel, and picked up and delivered at various points.

Figure 4:
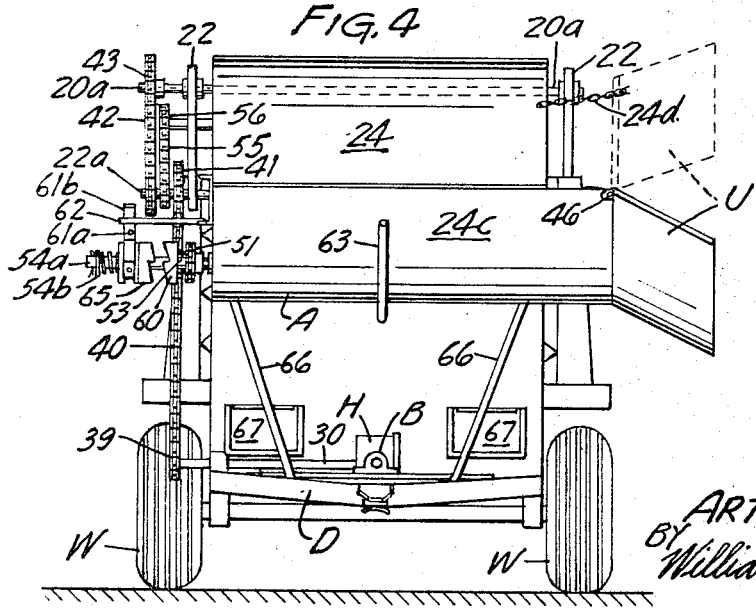
FIG. 4 is a front end elevation of the machine, showing, in dotted lines, the discharge chute in tranport position.

Referring now to the discharge of material after a mass of the various heavy and lighter and smaller ingredients have been thoroughly admixed, the discharge casing and hopper 24 at the upper portion traverses the entire width of container C and has of course no function in the admixing of the materials in operation of the three conveyors B-C, U-C, and T-C, and receives no material in such mixing operation. The sides 24a of hopper 24 which are of segmental shape as shown, are provided with wide arcuate slots 24b which are concentric with the pivot shaft 22a and which accommodate the upper shaft 20a which is journaled in the upper ends of shift arms 22. When the upper reach portion of conveyor U-C is disposed in the forward portion of the discharge hopper 24 (as shown in dotted line position of FIG. 3), then the mixed materials travel over the upper extremity of upstanding conveyor U-C, dropping forwardly and downwardly through a short spout section 24c of the housing (which extends the full width of the front of mixing container C) upon the top of a large discharge screw conveyor or auger, designated as an entirety by the letter A. This auger efficiently moves the material transversely (as shown, to the left side of the machine), where the material slides transversely down a large U-shaped chute U, open at its outer end for controllably delivering to a desired area such as a bunker, pile or other point of delivery. Chute U as shown in FIG. 4, is swingably shiftable upwardly on hinge pivots 46 to a transport position indicated in dotted lines in FIG. 4 and may be held suspended by suitable means such as a chain 24d.

The several driving connections for the various conveyors and moving parts will now be described.

The rear terminal portion of the power take-off P is suitably connected (as by bevel gear or worm gear) within a transmission housing H with a forward, transverse driven shaft 30 at the forward lower corner of the mixing container C. Power is taken off of the right hand end of said transverse shaft 30 for slowly driving the bottom conveyor B-C, the fast traveling upstanding conveyor U-C, and the fast traveling top conveyor T-C, as well as the discharge screw conveyor or auger A (ee FIGS. 1, 4 and 7).

As shown, an endless roller chain 31 trained over a small sprocket 30a at the right hand end of transverse shaft 30, drives a relatively large sprocket 32 journaled on a stub shaft 32a affixed to the right hand wall 14 of the mixing container. Said sprocket 32 constitutes part of a speed reduction transmission for ultimately driving the bottom conveyor B-C at low speed. Sprocket 32 has concentrically affixed to the outer face thereof, and journaled on the same stub shaft 32a a relatively small sprocket 33 which in turn has entrained thereabout a roller chain 33a for driving a larger sprocket 34 journaled on a second stub shaft 34a, also affixed to the right side wall 14 of the mixing container. The larger sprocket has affixed concentrically to the outer face thereof, a small sprocket 35 which is also journaled on the stub shaft 34a and which as shown, drives through the medium of an endless roller chain 36, a substantially larger sprocket 37 which is affixed to the outer end (beyond wall 14) of the driven shaft 17c of the bottom conveyor B-C.

Upstanding conveyor U-C is driven through the medium of a small chain sprocket 39 affixed to shaft 30 inwardly of the sprocket 30a and having entrained thereabout an elongated, upwardly extending roller chain 40. This chain 40 at its upper portion, is entrained about a substantially larger chain sprocket 41 which is affixed to shaft 22a and drives the same (see FIGS. 1 and 4). The shaft 22a it will be remembered, also acts as a transverse pivot for the shift arms 22 of channel shape, which at their outer ends carry and journal the transverse shaft 20a, having the upper sprockets 20 affixed thereto, about which the elongated endless chains 19 of the upstanding conveyor C are trained. A short endless chain 42 is entrained about a sprocket 42a affixed to shaft 22a and drives a somewhat larger sprocket 43 affixed to top shaft 20a for the upstanding conveyor U-C. Elongated, upstanding endless chain 40 is tightened by an adjustable idler sprocket 40a.

To selectively drive auger A, the rearward leaf of elongated endless chain 40 is wrapped around and drives a chain sprocket 49 mounted on a fixed stub shaft 49a and said sprocket has affixed thereto inwardly disposed concentric sprocket 50 about which is trained a roller chain 51 and, also trained about a forwardly disposed, similarly sized sprocket 52 affixed to a short transverse sleeve 53. Sleeve 53 is journaled on the exterior of a tubular shaft 54a which is internally splined (not shown) upon the right end of auger shaft 54. The driven sleeve 53 has affixed thereto a serrated clutch disc 60.

A clutch mechanism (see FIGS. 2 and 4) is provided for normally disconnecting driving of the screw conveyor A and as shown, includes a toothed clutch disc 65 affixed to the short tubular shaft 54a. Tubular shaft 54a, and of course its affixed clutch disc 65, is normally retracted by suitable means such as a coil spring 65a interposed between the outer side of the bifurcated end 61c of the shift lever 61 and an abutment 54b secured near the outer extremity of the short internally splined tubular shaft 54a. Shift lever 61 is pivoted intermediately on a pivot 61a and has a rearward actuating arm 61b which is connected by a transverse rod 62 with a control lever handle 63 (see FIG. 4) for shifting short tubular shaft 54 to engage clutch disc 60 with the clutch disc 54 affixed to shaft 54. Thus, the discharge of material, after shifting of the upper reach of upstanding conveyor U-C from the full line position shown in FIG. 3 to the dotted line position, is accomplished by swinging the lever 63 to engage the two clutch elements 60 and 65.

The top conveyer T-C is constantly driven at high speed by an endless chain 55 which is trained about a smaller sprocket affixed to the driven shaft 22a and about an upwardly and rearwardly disposed chain sprocket 56 which is affixed to the forward shaft 26a of the top conveyor T-C.

At the left side of the machine, as shown (see FIG. 2), an elongate depending lever 22a is affixed to the channel shift arm 22 by the swinging of which the two shift arms 22 may be swung from the full line position of FIG. 3 to the dotted line position.

The forward end of mixing container C is braced and reinforced by two widely spaced, diagonal bars 66 which are rigidly connected respectively with the forward corners of the walls 14 and at their lower ends are rigidly bolted to the two side converging elements of the draft bar D.

As shown in FIG. 4, the front wall 13 of the mixing container C adjacent the bottom thereof, is provided with two widely spaced, clean-out doors 67 which when open provide access to the spaced chain flights 19 just forwardly and below the bottom conveyor B-C.

Here it should be pointed out that the forward run of chains 19 for the upstanding conveyor U-C are housed and protected by an upstanding forward wall 13a spaced appropriately from the main forward wall 13 of the mixing container C.

*Operation*

Since the top of mixing container C is open it will be appreciated that feed materials to be mixed may be dumped by chute, elevator or manual operation upon the top conveyor T-C and will drop through the wide spaces between slats 25a into container C. Usually, but not necessarily, the heavier and larger fragmented material such as silage or other heavy or tacky forage crops, are introduced into the mixing container first.

The machine, being mobile, may be traveled from one source of supply to another during the mixing operation and the various additional feed ingredients such as hammer-milled corn, alfalfa, hay, pellets, etc., added.

The function and steps which inherently occur in the operation of my herein described machine, are very important and produce novel and improved results as compared with any known prior art machines.

When power is connected from the forward and lower transverse driven shaft 30 to the three conveyor mediums B-C, U-C and T-C, feed material dumped upon fast top conveyor T-C will be spread and toppled to some extent by the upper and lower runs and by transverse slats 25a thereof, usually dropping upon the slow moving bottom conveyor and thereafter on the mass of feed material supported and slowly moved in a forward direction thereon. The upstanding lifting and toppling conveyor U-C, in mixing operation is disposed as shown in full lines in FIG. 3, with the greater part of its effective length being inclined forwardly at an angle about 10° to 15° from the vertical.

The lower and effective mixing run of the top conveyor T-C travels at a speed several times that of the bottom support conveyor B-C (preferably within a range of from 4 to 6 times).

The upstanding conveyor U-C topples many of the feed fragments in the upward travel of its innermost run and at the upper reach thereof and deflects lifting of the feed fragments to the receiving end of the fast moving top conveyor T-C. The lower run of this top conveyor very rapidly skims the materials when massed, toppling the same and spreading and fluffing these materials rearwardly. The result is that the components of the upper strata of the massed material supported on bottom conveyor B-C are spread, fluffed, and with the assistance of gravity, dropped into and between particles of the under stratas of feed material. There is no need for any conveying medium at the rear of mixing container C since with the help of gravity the fast traveling rearwardly moving top conveyor and the slow, forwardly moving bottom conveyor B-C, the mass is turned through an elliptical course, mixing forwardly upon conveyor B-C.

Again referring to the functions of top conveyor T-C, the top slats, as shown in FIG. 3, are of angle bar construction but of course could be in other forms and it will be understood that due to the very rapid traveling speed of the top conveyor T-C and the effective lower run thereof, these slats moves and spreads particles of all sizes rearwardly of the central mass and has particularly a skimming action on the larger and heavier particles or fragments such as silage materials.

As an example of a successfully operating embodiment of the invention which has been thoroughly tested, the mixing container C is of dimensions to hold and with the conveyor systems, uniformly admix a volume of 200 to 300 cubic feet of the several feed materials desired to be discharged at will from the machine. The traveling speed of the bottom conveyor B-C which accumulates mass and travels as shown in FIG. 3 to the forward end of the machine, is approximately 50 feet per minute. The speed of the effective inner run of upstanding conveyor U-C is approximately 126 traveled feet per minute. The traveled foot per minute speed of the top conveyor T-C, the effective lower run of which travels in opposite direction from that of the bottom conveyor B-C, is approximately 125 traveled feet per minute.

Exhaustive tests of said embodiment and several other embodiments of the invention successfully reduced to practice, show that a very uniform admixture of a number of different feed ingredients varying widely in size, shape and specific gravity, may be accomplished. The close flow operating relationship between the conveyors B-C, U-C and T-C have proven that my invention is particularly successful in admixing heavy large fragment ingredients such as silage and the like with smaller granular or other pelleted, ground or cut feed material.

Referring now to the form of the invention illustrated in FIG. 5, it is to be assumed that with the exception of the top conveyor, the working parts and combination thereof, are similar to the form disclosed in FIGS. 1 to 4 and FIG. 7. In place of the slatted top conveyor shown in FIG. 3, three longitudinally spaced endless chain conveyors 75 and 76 are employed, having affixed in spaced relation to the endless driven chains, cross slats 75a and 76a respectively.

It will be noted that the central endless chain 76 is entrained about two sprockets 73 and 74 which are of larger diameter than the sprockets 71 about which the two side chains 75 are entrained. The forwardly disposed sprockets 71 and 73 are all affixed to a common driven shaft 70 which at its outer end beyond the right hand side wall of mixing container C, has a driven sprocket 70a.

In this form of the invention, the feed materials received from the upstanding conveyor U-C at the upper end thereof and skimmed from the accumulated mass, are moved rearwardly but the moving of the central zone of said materials is faster because of the enlarged sprockets 73 and 74 than the spreading and travel of the materials at the longitudinal sides of the container box. This alternative construction is probably preferable with large size or cut silage fragments. The centrally disposed slats 76a move at greater travel speed, tending to prevent accumulating or crowding materials at the longitudinal sides of the top portion of the mixing container.

Figure 6:
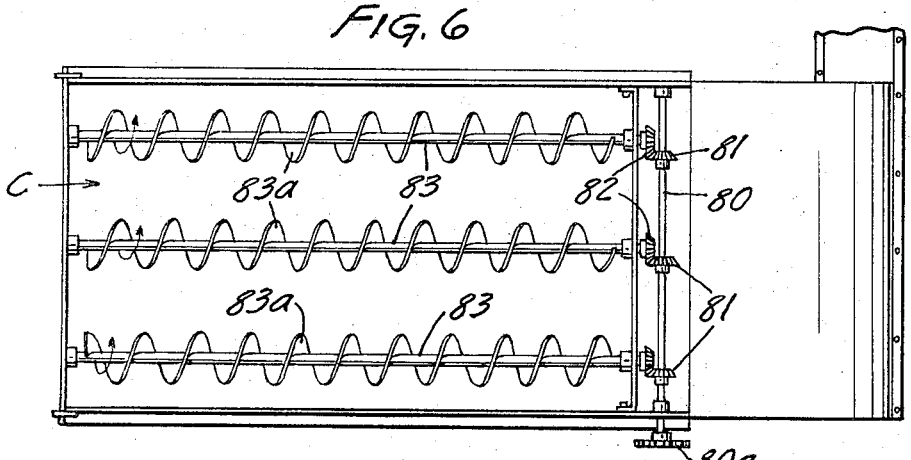
FIG. 6 is a top elevation of another modified form of the invention.

In FIG. 6 another alternative construction for the generally horizontally disposed top conveyor is illustrated. Here, instead of endless slat conveyors, a plurality, as shown, of conveying screws 83 are employed, disposed in longitudinally spaced, parallel relationship and all affixed to similar shafts 83. As shown, the forward ends of the shafts 83 are predeterminately driven by bevel gears 82 attached to the forward projecting ends of shafts 83 which are meshed with bevel gears 81 affixed to a transverse driven shaft 80. Driven shaft 80 as shown, has a sprocket 80a at the right end thereof, about which (not shown) a driving chain is entrained.

It will of course be understood that while carrying out the general principles of differential speed for the central conveying medium, the pitch of the central screw 83a may be sharper or at greater angulation than the flights 83a of the sidemost conveyors.

From the foregoing description it will be seen that I have provided a substantially improved and new mixing machine for overcoming the problems present in prior art devices, to achieve uniform admixing and discharge from time to time at will, of materials such as silage and other coarse fragmented materials with either finer silage materials or with a number of desired feed ingredients which vary substantially in specific gravity, size and shape.

It will of course be understood that various changes may be made in the form, details, arrangement and proportions of the various parts without departing from the scope of my invention.

In all forms of the invention disclosed herein the mobile machine may be utilized for collecting, transporting and discharging from the rear of the mixing container, various materials, supplies and the like. In this connection the drive for the supporting bottom conveyor B-C is reversed by any suitable means such as a reversing mechanism (not shown) mounted upon the draft frame D whereby the upper effective run of conveyor B-C is driven rearwardly towards the wall or hinged gate 15.

Means (not shown) are provided for releasably locking rear gate 15 in vertical full line position shown in FIG. 3. The body container C may be loaded by dropping fragmented material through the open top thereof, or if packaged or large sized material is to be collected, the machine may be loaded by raising hinged rear end 15 and successively loading such material on bottom conveyor B-C with attendant forward travel of bottom conveyor B-C until the desired mass of bundles, packages or other large material are contained. Thereafter, the machine may be traveled to one or more locations for discharge and the gate then is released and the bottom conveyor B-C reversed to successively discharge rearwardly from the device.

What is claimed is:

1. In a feed mixing machine for intimately admixing a plurality of different fragmented materials which vary substantially in shape, specific gravity and size, and for also controllably discharging a uniform admixture as desired, said machine having a generally rectangular enlarged mixing container provided with a bottom, side and end walls, those improvements which comprise, a bottom conveyor section driven at relatively low travel speed towards one end wall of said container and traversing substantially the width thereof, an upstanding conveyor section disposed inwardly of one of the end walls of said container and also traversing substantially the width thereof, and driven to travel upwardly and receive material from said bottom conveyor section and its accumulated load of material, said upstanding conveyor having transverse, inwardly protruding elements, the speed of travel of said upstanding conveyor being at least several times the speed of travel of said bottom conveyor, a third conveyor medium substantially horizontally disposed near the level of the upper end of said upstanding conveyor and normally receiving material from said upstanding conveyor and also skimming, fluffing and spreading material from the accumulated mass on said slow moving bottom conveyor, said upper conveyor being driven to travel in opposite direction from said lower conveyor and at a travel speed at least several times the speed of said slower bottom conveyor, said upper conveyor section having conveyor elements cumulatively traversing substantially the entire width of said container, shiftable means for, when desired, causing mixed material to be discharged from said container, and means for permitting entrance of feed materials into said container from time to time whether or not said machine is in operation.

2. The improvements and structure set forth in preceding claim 1 further characterized by, a discharge receiving hopper disposed outwardly of said upstanding conveyor section and surrounding the upper end thereof, said upstanding conveyor section at its upper end being shiftable from an inward mixing position to an outwardly declined discharging position whereby mixed material when desired, will be delivered into said discharge hopper, and means associated with said discharge hopper for directing discharge of mixed material at a desired unloading point.

3. The structure set forth in claim 1 further characterized by, said upstanding conveyor section being disposed at the forward end of said container body, the rear end of said container having a door which may be opened at least adjacent the lower portion thereof, and means for reversing the driving and travel of said bottom conveyor whereby with said door open, mixed or other material may be discharged rearwardly of the machine through passage defined by the opening of said door.

4. In a feed mixing machine for intimately admixing a plurality of different fragmented materials which vary substantially in shape, specific gravity and size, and for also controllably discharging a uniform admixture as desired, said machine having a generally rectangular enlarged mixing container provided with a bottom, side and end walls, those improvements which comprise, a bottom, substantially horizontal conveyor section driven at relatively low travel speed towards one end wall of said container, an upstanding conveyor section disposed inwardly of said last mentioned end wall and traveling upwardly and receiving material from said bottom conveyor section and its accumulated load of material, a third conveyor and distributing medium disposed substantially horizontally near the top of said mixing container and normally receiving material from said upstanding conveyor and traveling in the opposite direction from said bottom conveyor section at a travel speed of at least several times that of said bottom conveyor for fluffing, spreading and skimming material, shiftable means for causing, when desired, mixed material to be discharged from said conveyor, and means for permitting entrance of feed materials from time to time into said container.

5. The structure set forth in preceding claim 4 further characterized by, said third and top conveyor and distributing medium comprising a plurality of substantially parallel conveyor elements extending longitudinally in spaced relation from the forward end to adjacent the rearward end of said mixing container, one of said elements disposed centrally of the other being driven at a faster traveling speed than said other elements.

6. The structure set forth in claim 5 further characterized by said top conveyor and distributing medium comprising a plurality of endless driven chains having each affixed thereto a plurality of transverse slats, said plurality including a central driven chain, and means for driving said central chain at a higher travel speed than the other chains of said plurality.

7. The structure set forth in preceding claim 4 wherein said mixing container has a releasable discharge gate normally constituting a part of the rearward wall thereof, mechanism for reversing the travel of said bottom conveyor section from normal travel towards the front end of said container.

8. The structure set forth in preceding claim 4 further characterized by, said third and top conveyor and distributing medium comprising a plurality of driven exposed screw conveyor elements extending longitudinally in spaced relation from adjacent the forward end to adjacent the rearward end of said mixing container.

References Cited

UNITED STATES PATENTS

| | | | |
|---|---|---|---|
| 2,756,887 | 7/1956 | Raney | 214—519 |
| 2,896,923 | 7/1959 | Luscombe | 259—97 X |
| 3,133,727 | 5/1964 | Luscombe | 259—97 X |
| 3,273,734 | 9/1966 | Schuler | 214—521 |

ROBERT W. JENKINS, *Primary Examiner.*